C. A. CLOUSER.
PRESSURE GAGE OR INDICATOR.
APPLICATION FILED OCT. 27, 1913.
1,177,992.
Patented Apr. 4, 1916.
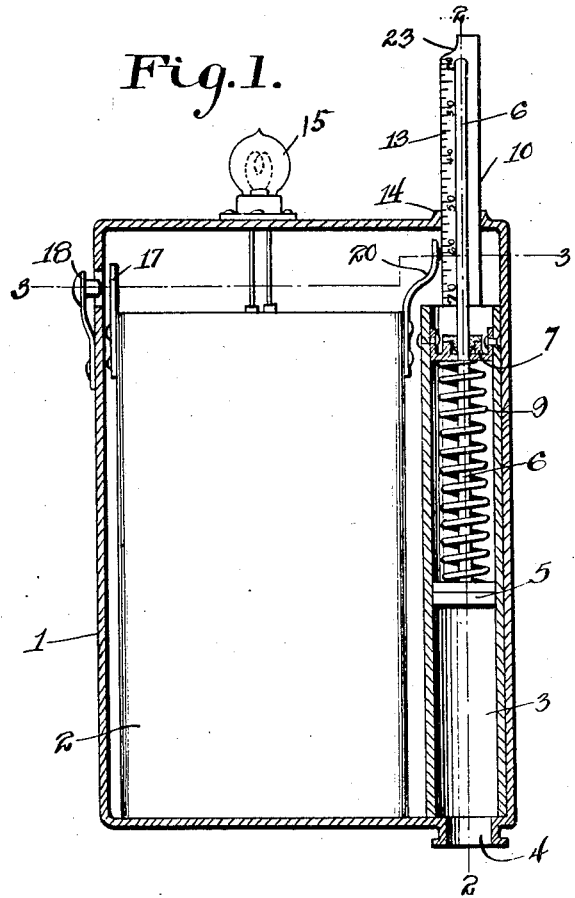
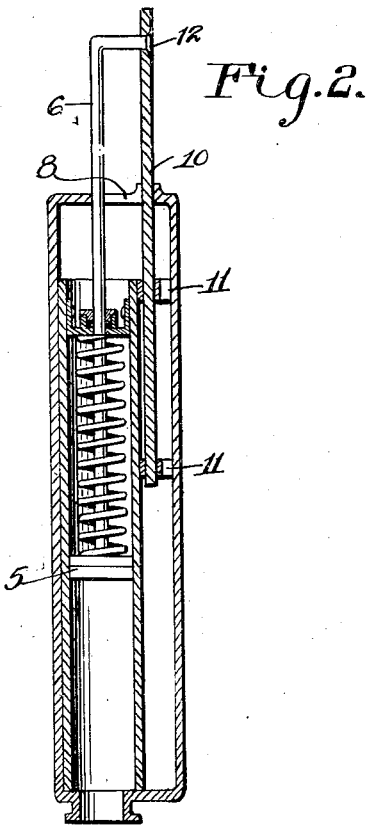
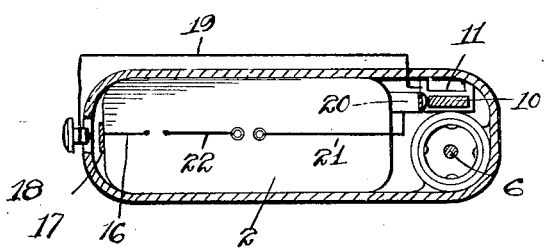
Witnesses
Wm H Mulligan
C. H. Crawford
Inventor
Charles A. Clouser,
By Richard Owen,
his Attorney

UNITED STATES PATENT OFFICE.

CHARLES A. CLOUSER, OF NEW SMYRNA, FLORIDA.

PRESSURE GAGE OR INDICATOR.

1,177,992.     Specification of Letters Patent.     Patented Apr. 4, 1916.

Application filed October 27, 1913. Serial No. 797,582.

*To all whom it may concern:*

Be it known that I, CHARLES A. CLOUSER, a citizen of the United States, residing at New Smyrna, in the county of Volusia and State of Florida, have invented certain new and useful Improvements in Pressure Gages or Indicators, of which the following is a specification.

This invention relates to improvements in gage devices for attachment to pressure bodies such as tires to determine the extent of pressure therein.

The use of tire pressure gages is often rendered difficult by reason of the fact that it is sometimes necessary to take a pressure reading in dark places where a light is necessary, and while pressure gages have been proposed wherein the graduated member is only moved under or responsive to pressure action, and thereafter remains stationary to preserve the reading, such gages have been found in practice to be misleading and inaccurate by reason of the fact that return friction of parts which are moved to an initial position often serves to change the reading position of the parts.

It is one of the objects of my invention to provide in a single structure which may be readily carried in the hand, a pressure gage for obtaining a pressure reading, a source of supply of current together with an electric lamp for illuminating the reading, when desired, and a finger make and break, whereby the circuit may be closed to render illumination of the lamp automatic or whereby the circuit may be retained open, in accordance with the conditions under which the gage is used.

Other features of novelty will be more fully described in connection with the accompanying drawing and will be more particularly pointed out and ascertained in and by the appended claims.

In the drawing:—Figure 1 is a vertical sectional view illustrative of one form of my invention. Fig. 2 is a sectional view on line 2—2 of Fig. 1. Fig. 3 is a sectional view on line 3—3 of Fig. 1.

Like characters of reference designate similar parts throughout the different figures of the drawing.

As illustrated, 1 designates a casing of a size which can readily be carried in a pocket of the user's apparel, and which can be readily manipulated or carried in the hand, and in which is disposed a source of current preferably in the form of a battery 2. Within the casing 1 I dispose a cylinder 3 which opens through an extension 4 of the casing. The extension 4 of the casing may be provided with any kind of coupling for attachment to a tire nipple when the dust cap has been removed but inasmuch as this particular feature does not constitute a part of my invention, I have not illustrated such coupling. Slidable within the cylinder 3 is a piston 5 which is movable responsive to any pressure which the device of my invention is utilized to indicate or gage. The piston 5 is provided with a piston rod 6 which extends upwardly through a closed head 7, of the cylinder 3, and through an opening 8 in the top of the casing 1. A spring 9 is interposed between the piston 5 and the head 7 to afford sufficient resistance to movement of the piston 5 responsive to the pressure to be indicated, such as will afford an accurate reading.

An indicating or gaging member 10 is slidable in the casing in guides 11 and is connected with the piston rod 6, as indicated at 12. Suitable graduations 13 may serve when moved abreast of a portion of the structure 14, to disclose a reading or gaging indication of the pressure in the tire. An electric lamp 15 is disposed in such adjacency to the indicator member 13 that the rays of light directed therefrom will permit the user to see and determine the reading when the device of my invention is used in dimly lighted or darkened places.

It is one of the objects of my invention to provide means whereby the electric lamp 15 will be caused to glow, automatically, upon movement of the parts responsive to pressure action to be indicated when the device is used in darkened surroundings, or, to cut out the lamp 15 from automatic action when the device is used in daylight.

I have diagrammatically illustrated a circuit, in connection with Fig. 3, wherein a conductor 16 leads from one pole of the source of current to a member 17 of a manual make and break device, the other member thereof being indicated at 18. From 18 a conductor 19 leads to one of the guides 11 to the indicating member 13 which forms one member of a make and break device, acting automatically, through a contact 20. From the contact 20 a conductor 21 leads to the lamp and from the lamp a conductor 22 leads to the other pole of the source of current. The indicating member 10 is recessed at 23 so that when the indicating member is not in a gaging or indicating position, as when the piston 5 is in the lower end of the cylinder 3, the indicating make and break device comprising parts 10 and 20 will be out of engagement with each other. Immediately upon movement of the piston 5 responsive to pressure action, the part 10 will immediately be brought into engagement with the contact 20 so as to automatically close circuit when the manual make and break device 18 and 17 is closed by the fingers or the thumb of the operator. It will thus be seen that I have provided for the greatest possible battery economy by reason of the fact that the lamp 15 will only be caused to glow, automatically under the indicator make and break device, when the manual make and brake device is closed, thus it will be seen that I effectively illuminate the indicator so that immediately upon its movement to a pressure indicating position, such indication can be immediately read and then the lamp 15 can be cut out by releasing the member 18.

It is believed that the device of my invention will be fully understood from the foregoing description, and while I have herein shown and described one specific form of my invention, I do not wish to be limited thereto except for such limitations as the claims may import.

I claim:—

1. In a pressure gage or indicator, a structure comprising a pressure chamber or cylinder for connection with the pressure body to be gaged, a piston movable in said cylinder responsive to the pressure to be gaged, a graduated member actuated by the piston abreast of a portion of the structure to disclose a pressure reading, an electric lamp on said structure adjacent said member, a circuit including said lamp and a source of supply of current, and an automatic make and break device bridged in said circuit and comprising said graduated member and a spring contact for engagement therewith only when said member occupies pressure indicating positions, substantially as described.

2. In a pressure indicator or gage, a structure comprising a pressure chamber or cylinder for connection with the pressure body to be gaged, a piston movable in said cylinder responsive to the pressure to be gaged, a graduated member actuated by the piston abreast of a portion of the structure to disclose a pressure reading, an electric lamp on said structure adjacent said member, a circuit including said lamp and a source of supply of current, an automatic make and break device bridged in said circuit and comprising said graduated member and a spring contact for engagement therewith during movement of said graduated member for pressure indications, said graduated member being cut away so as to release engagement between said make and break member when the graduated member is in an initial position, substantially as described.

3. In a pressure gage, a structure comprising a pressure cylinder for connection with the pressure body to be gaged, a piston movable in said cylinder responsive to the pressure to be gaged, a graduated member actuated by said piston abreast of a portion of the structure to disclose a pressure reading, an electric lamp on said structure adjacent said member, a circuit including said lamp and a source of supply of current, an automatic make and break device bridged in said circuit, and comprising said graduated member and a spring contact for engagement therewith under movement of the graduated member for pressure indications, and a manual make and break device bridged in said circuit for rendering said first-named make and break device operative or cutting out the lamp upon movement of said graduated member, substantially as and for the purposes set forth.

4. In a pressure gage, a casing, a battery in the casing, a cylinder in said casing for connection with the pressure body to be gaged, a piston in said cylinder movable responsive to the pressure to be gaged, a piston rod for said piston projecting exteriorly of the casing, a graduated member projecting exteriorly of the casing and abreast of a portion thereof to disclose the pressure reading, said piston rod being connected with the graduated member exteriorly of the casing, an electric lamp on the casing adjacent said graduated member, a circuit including said lamp and the battery as a source of current, an automatic make and break device bridged in said circuit and comprising said graduated member and a spring contact engaging the graduated member interiorly in said casing, and a manual make and break device bridged in said circuit and operable exteriorly of said casing, substantially as described.

In testimony whereof I affix my signature in presence of two witnesses.

CHARLES A. CLOUSER.

Witnesses:
F. A. NEWELL,
J. S. DUSS.

Copies of this patent may be obtained for five cents each, by addressing the "Commissioner of Patents, Washington, D. C."